(12) United States Patent
High

(10) Patent No.: US 8,516,676 B2
(45) Date of Patent: Aug. 27, 2013

(54) METHOD OF MANUFACTURE OF AEROFOIL ASSEMBLIES HAVING DATUM FEATURES LOCATED IN COMPLEMENTARY FIXTURES

(75) Inventor: Colin J. High, Glasgow (GB)

(73) Assignee: Rolls-Royce PLC, London (GB)

( * ) Notice: Subject to any disclaimer, the term of this patent is extended or adjusted under 35 U.S.C. 154(b) by 192 days.

(21) Appl. No.: 12/451,252

(22) PCT Filed: May 19, 2008

(86) PCT No.: PCT/GB2008/001714
§ 371 (c)(1),
(2), (4) Date: Nov. 3, 2009

(87) PCT Pub. No.: WO2008/155513
PCT Pub. Date: Dec. 24, 2008

(65) Prior Publication Data
US 2010/0126017 A1 May 27, 2010

(30) Foreign Application Priority Data
Jun. 16, 2007 (GB) .................................. 0711697.3

(51) Int. Cl.
*B23C 3/18* (2006.01)
*B23B 1/00* (2006.01)

(52) U.S. Cl.
USPC ................ 29/418; 29/559; 29/889.7; 29/423; 269/268

(58) Field of Classification Search
USPC ............... 29/418, 559, 557, 889.7, 707, 423, 29/527.6; 416/219 R, 143 A, 193 A, 248; 269/268
See application file for complete search history.

(56) References Cited

U.S. PATENT DOCUMENTS

| | | | | |
|---|---|---|---|---|
| 2,309,260 A | * | 1/1943 | Strauss | 82/1.11 |
| 2,323,972 A | * | 7/1943 | Brauchler | 29/527.6 |
| 2,612,082 A | * | 9/1952 | Angell et al. | 29/559 |

(Continued)

FOREIGN PATENT DOCUMENTS

| DE | 35 21 285 C1 | 9/1986 |
|---|---|---|
| EP | 0 909 879 A2 | 4/1999 |

(Continued)

OTHER PUBLICATIONS

British Search Report issued in British Application No. 0711697.3; Mailed on Oct. 7, 2007.

(Continued)

*Primary Examiner* — David Bryant
*Assistant Examiner* — Jason L Vaughan
(74) *Attorney, Agent, or Firm* — Oliff & Berridge, PLC

(57) ABSTRACT

A method of fixturing a plurality of dissimilar blade assemblies, wherein each assembly undergoes one or more manufacturing steps to bring it to a finished form, the method comprising the step of providing on each of the articles a datum feature, wherein each datum feature is of identical form and dimension, in turn a) locating the datum feature of a first one of the articles in a complimentary fixture to secure the dissimilar article, b) performing at least one manufacturing step on the secured dissimilar article, c) removing the dissimilar article from the fixture, d) locating the datum feature of another of the articles in the complimentary fixture to secure the dissimilar article, e) performing at least one manufacturing step on the secured dissimilar article, f) removing the dissimilar article from the fixture.

18 Claims, 5 Drawing Sheets

(56) References Cited

U.S. PATENT DOCUMENTS

| | | | |
|---|---|---|---|
| 3,029,497 A * | 4/1962 | Nelson | 29/889.7 |
| 3,691,630 A * | 9/1972 | Burgess et al. | 29/600 |
| 4,576,551 A | 3/1986 | Olivier et al. | |
| 4,621,410 A * | 11/1986 | Williamson | 483/1 |
| 4,894,909 A * | 1/1990 | Sakamoto et al. | 29/719 |
| 4,916,293 A * | 4/1990 | Cartlidge et al. | 235/375 |
| 5,081,765 A * | 1/1992 | Fraser et al. | 29/889.1 |
| 5,168,608 A * | 12/1992 | Fraser et al. | 29/26 A |
| 5,240,746 A * | 8/1993 | O'Connell Litteral | 427/510 |
| 5,271,953 A * | 12/1993 | Litteral | 427/8 |
| 5,632,214 A * | 5/1997 | Conley et al. | 112/470.06 |
| 5,869,194 A * | 2/1999 | Dwyer | 428/542.8 |
| 5,954,464 A * | 9/1999 | Dansereau et al. | 409/293 |
| 5,964,016 A * | 10/1999 | Ito et al. | 29/27 C |
| 6,068,541 A * | 5/2000 | Dwyer | 451/28 |
| 6,139,412 A * | 10/2000 | Dwyer | 451/365 |
| 6,185,818 B1 * | 2/2001 | Ito et al. | 29/889.7 |
| 6,976,814 B2 * | 12/2005 | Newman | 409/225 |
| 7,146,705 B2 * | 12/2006 | Ahti et al. | 29/563 |
| 7,178,255 B1 * | 2/2007 | Roesel et al. | 33/645 |
| 2001/0020762 A1 * | 9/2001 | Helm et al. | 269/21 |
| 2003/0114080 A1 | 6/2003 | Jones et al. | |
| 2004/0244180 A1 * | 12/2004 | Jones et al. | 29/559 |
| 2005/0186045 A1 * | 8/2005 | Killer et al. | 409/132 |
| 2006/0137169 A1 * | 6/2006 | Boehm et al. | 29/557 |
| 2007/0107181 A1 | 5/2007 | Vau et al. | |

FOREIGN PATENT DOCUMENTS

| | | |
|---|---|---|
| EP | 1 077 308 A1 | 2/2001 |
| GB | 2 181 374 A | 4/1987 |
| GB | 2 428 396 A | 1/2007 |
| GB | 2 430 170 A | 3/2007 |

OTHER PUBLICATIONS

International Search Report and Written Opinion issued in International Application No. PCT/GB2008/001714; Mailed on Sep. 8, 2008.

* cited by examiner

METHOD OF MANUFACTURE OF AEROFOIL ASSEMBLIES HAVING DATUM FEATURES LOCATED IN COMPLEMENTARY FIXTURES

BACKGROUND

This invention relates to a method of fixturing a plurality of dissimilar articles for example during the manufacture of aerofoil components for a gas turbine engine. Particularly a reference feature is formed on each article to provide a reference datum for precision manufacturing of the article. See, for example, U.S. Patent Application Publication No. 2007/0107181.

SUMMARY

FIG. 1 shows a conventional compressor blade assembly 2. The blade assembly comprises an aerofoil portion 4 and a root portion 6. The root portion secures the blade securely within a rotor disc, the shape of the root engaging a correspondingly shaped slot within the disc. The aerofoil portion 4 is shaped to push fluid rearward and, in combination with a non-rotating stator, compress the fluid.

The blade assembly is located onto the disc along with a number of other identical blade assemblies to form a rotor assembly having a circumferentially extending array of blade assemblies.

A compressor assembly comprises one or more stages with each stage comprising a rotor assembly and a stator assembly—which is a circumferentially extending array of non-rotating stators. Whilst each blade assembly within a stage is of identical design the blade assemblies between stages may differ. A significant number of blade structures are possible including: shrouded blades, shroud-less blades, variable vanes, as well as a similar number of stator structures such as single ended or double ended. Blade assemblies and stator structures may be described as aerofoil assemblies.

Finished blade assemblies are precise components of a gas turbine engine. The blade assemblies are formed either by casting or by forging. In the casting process a hollow ceramic shell is formed through a lost-wax process and filled with molten metal which is cooled to create a component.

To achieve the precision fits demanded by a gas turbine engine, machining is required to provide both an aerofoil surface acceptable for its aerodynamic purpose and a root portion correctly shaped to engage with its complementary holding feature in the rotor disk or shaped such that the aerofoil may be secured to a disk assembly in a unitary manner.

Methods of manufacture of complex articles can involve the article being marked with one or more reference marks to establish a datum.

GB2428396 teaches one such method where a bladed disk (blisk) has a permanent datum created at the start of the manufacturing sequence and which forms part of the finished component to assist in manufacture and repair. The datum assists in accurate referencing but is insufficiently robust to support or secure the part during machining.

U.S. Pat. No. 4,576,551 discloses a method involving three cone shaped protrusions integrally machined onto the blade which are used for location in a fixture. The location of the protrusions and the presence of the fixture seriously impede subsequent machining operations on the blade. Additionally, each of the datums is blade specific and the blade and rotors of each stage require specific fixturing which is expensive to produce.

It is an object of the present invention to seek to improve an improved datum feature.

According to a first aspect of the invention there is provided a method of fixturing a plurality of dissimilar aerofoil assemblies, the method including the steps of providing a datum feature on each of the aerofoil assemblies, wherein each datum feature is of identical form and dimension, in turn locating the datum feature of a first aerofoil assembly in a complementary fixture to secure the first aerofoil assembly, performing at least one manufacturing step on the secured first aerofoil assembly, removing the first aerofoil assembly from the fixture, locating the datum feature of a second aerofoil assembly in the complementary fixture to secure the second aerofoil assembly, performing at least one manufacturing step on the secured second aerofoil assembly, and removing the second aerofoil assembly from the fixture.

The method may further include the step of g) locating the datum feature of the first one of the articles in a second complementary fixture to secure the dissimilar article, h) performing at least one manufacturing step on the secured dissimilar article, and i) removing the dissimilar article from the fixture.

Preferably the manufacturing steps are selected from a group comprising milling, grinding, turning, chemical machining, polishing, and inspection.

The dissimilar articles are aerofoil assemblies. The aerofoil assemblies may be dissimilar in shape and/or size. The datum feature is provided on a root portion of the aerofoil assemblies, and protrudes from the root portion. Preferably the datum feature has a plurality of datum faces. Preferably the datum feature has an asymmetrical cross-section.

BRIEF DESCRIPTION OF THE DRAWINGS

Embodiments of the invention will now be described by way of example only, with reference to the accompanying drawings, in which.

DETAILED DESCRIPTION OF EMBODIMENTS

Figure 1:
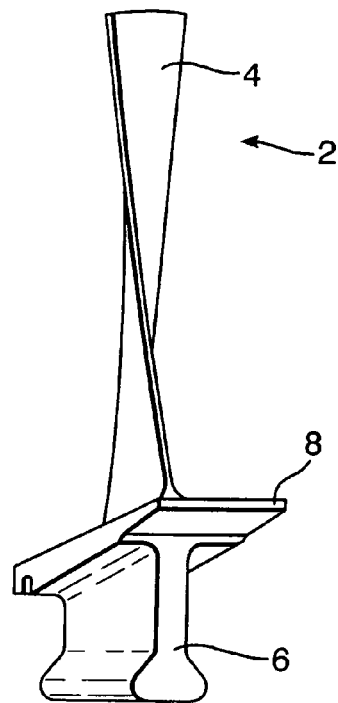
FIG. 1 shows a conventional compressor blade assembly 2.
Figure 2:
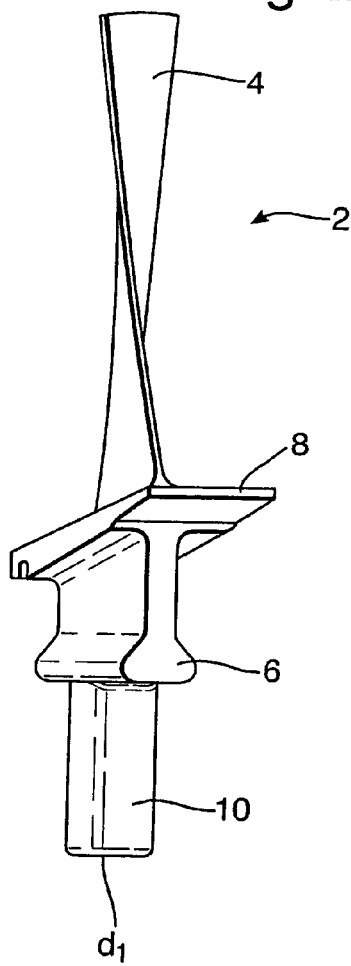
FIG. 2 depicts a datumed aerofoil in accordance with the invention.

FIG. 2 depicts an aerofoil with a datum feature or fixing 10 located thereon. The general form of the fixing 10 is preferably manufactured during the casting or forging process through which the aerofoil is manufactured. In the preferred embodiment the fixing 10 is located on the root portion of the blade assembly 2. Locating the fixing thus allows the fixing to be used both as a datum and a holding mechanism for the blade assembly during manufacture without impeding any machining operation which may be required on the blade assembly.

The preferred fixing depends from the blade assembly root in a direction that is opposite to that of the aerofoil. The fixing is robust enough to support the blade assembly in a holder through one or more processing steps.

Where the fixing is manufactured during the casting or forging stage it is generally not accurate enough to qualify as a datum and it may be machined to provide a datum.

If the fixing requires machining the machining is achieved by a three axes CNC machine. The forged root surface is clamped in a fixture using jaws and a CNC program is used to machine the sides and end face of the fixing.

Figure 3:
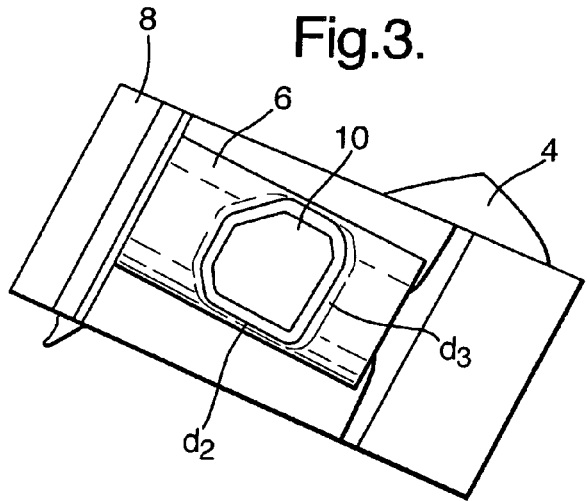
FIG. 3 depicts a bottom view of the aerofoil of FIG. 2 in accordance with the invention.
Figure 4:
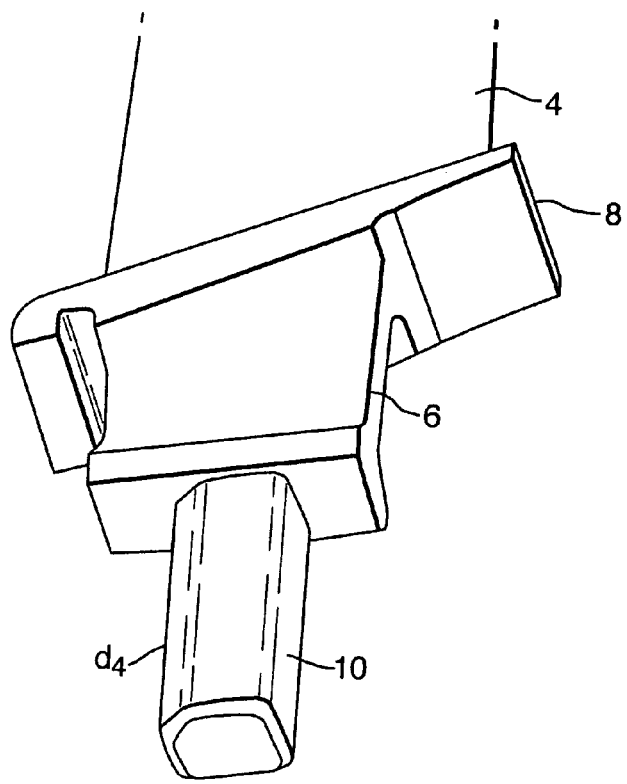
FIG. 4 shows a perspective view of the aerofoil of FIG. 2
Figure 5:
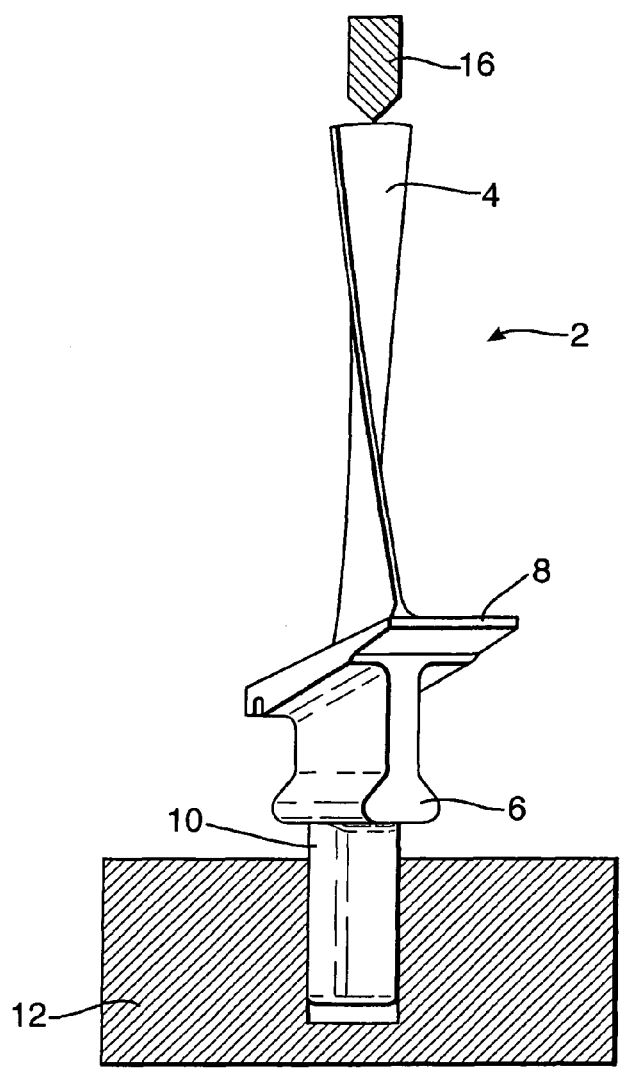
FIG. 5 shows the aerofoil of the invention secured within a fixture.
Figure 6:
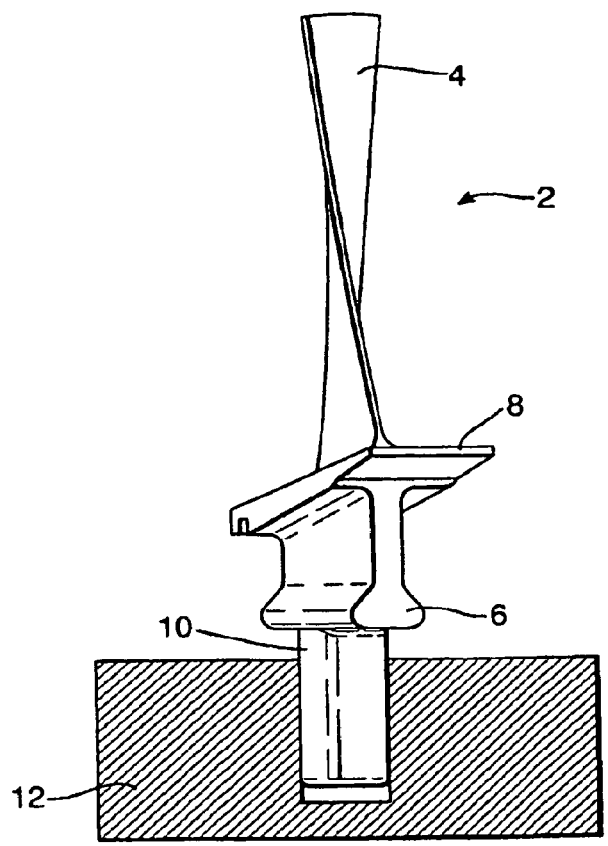
FIG. 6 shows the aerofoil of the invention secured within a fixture.

The machined datum is faceted and generally columnar. In cross-section the fixing is asymmetrical, which aids correct alignment of the blade assembly within the fixing holder. The fixing has at least three datum faces which, from FIG. 2 and FIG. 3, are shown as d1, d2 and d3. Datum d1 is the face of the fixing at the opposing end of the fixing to the blade root. Datums d2 and d3 are faces extending perpendicular to datum d1.

Datum d1 of the fixing locates against a corresponding lower face of the fixing holder and is held against this lower face by the weight of the blade assembly or some other biasing force. Datum faces d2 and d3 locate against corresponding side walls of the fixture by a biased face within the fixture.

As discussed above in the preferred embodiment the fixing is asymmetric and has a face d4 at 45° to the datum faces d2 and d3. The biased face of the fixture acts against this fixing face to push the datums d2 and d3 against their corresponding features in the fixture. Biasing may be achieved by mechanical means such as a spring or screw for example.

The fixing has a size and design such that an identical fixing may be used on many designs of blade. A first stage compressor blade typically has a root with dimensions of around 36 mm×80 mm×22 mm whilst an eighth stage compressor blade typically has a root dimension of 12 mm×20 mm×16 mm. Accordingly, the datum has a length of around 32 mm, and a cross-section of generally 15 mm by 15 mm which enables an identical datum to be provided on each of the blade assemblies for each of the stages within the compressor.

It will be appreciated that this invention offers significant advantages over conventional fixturing in that the number of fixtures required to manufacture different product shapes and types is reduced. The complementary feature permits the article to be aligned and orientated in a simpler and cheaper way than afforded by conventional fixtures and chucks.

As an identical fixing is provided for each blade type it is possible to locate and fixture each blade type using a holder with a feature complementary to the fixing. Similar holders with identical features may be used on all the machining equipment through which the blade assembly passes thereby allowing each blade assembly to be easily and quickly aligned and secured in each machine. Each machining operation is accordingly aligned to the same datum feature.

The holder or fixture in its simplest form is permanently secured to the machining equipment with the complementary feature at a known location in relation to the machine tool. The cross-section of the feature is the same as that of the datum, allowing the orientation of the blade to be determined by simple insertion of the datum into the tool feature.

In a more complex arrangement the holder is removably mounted to the machining equipment and is provided with alignment features to align it with the machining equipment. In this arrangement the fixing may be permanently secured within the holder such that the holder travels with the blade assembly between the machining equipment, or it may be removably secured within the holder 12.

The height of the fixing in combination with the depth of the complementary feature in the fixture enables the blade assembly to be easily located in the x, y and z dimensions.

The dimensions of the datum and the fit between the datum and the feature in the fixture securely hold the blade assembly during machining. Although not mandatory it is usual to support the blade at the tip to limit undesired vibration that may be generated during the manufacturing stage. Support is provided by a centre 16 formed by using a centre drill to create a small tapered hole in the end of the component. A hardened steel running centre of identical conical shape is inserted into the hole and clamped into position to provide component rigidity during machining. The centre can be positioned into the blade either automatically using a machine hydraulic system or can be positioned manually followed by clamping.

Following machining of the blade assembly the fixing provides a datum within a test apparatus that inspects the blade assembly for alignment and surface irregularities.

The final step during the manufacture of the blade assembly is to remove the fixing either by cutting or, if the fixing has been applied to the blade assembly by welding or gluing, by breaking the joint. Where the fixing has been applied by welding or gluing it will be appreciated that it may be formed of a different material to that of the blade assembly.

It will be appreciated that the present invention offers significant improvements over the prior art.

For example, the invention provides reduced blade movement during machining compared to a fixture clamped directly to the aerofoil, or a fixture clamped in an encapsulation media.

The invention offers a common location for all components and an improved known relationship between aerofoil and root features. Once the blade assembly is located in the disc the location of the aerofoil portion of the assembly is determined by the relationship of the aerofoil to the root. By offering an improved root to aerofoil relationship there is a direct impact on the aerofoil position within the engine leading to an improvement in airflow through the compressor or turbine, engine performance, emissions reduction and reduced fuel consumption.

Beneficially, the fixing and holder arrangement is easily adapted to automated loading and unloading as complex, individual fixtures can be eliminated. This enables volume production manufacture of complex components of difficult to create shapes—a set which includes medical components such as hip joints as well as other industrial components.

The fixing gives an improved rigidity for manufacturing applications over conventional clamping where a fixture clamps directly to the blade and can allow movement and deflection. By providing the fixing and complementary fixture along with the optional tip support any movement is significantly reduced and a quicker cutting process is enabled.

It will be appreciated that other shapes and sizes of fixings may be used as alternatives to the specific embodiment given above. The fixings must be able to secure the article to which it is attached within a complementary fixture for at least one manufacturing stage.

The invention claimed is:

1. A method of fixturing a plurality of dissimilar aerofoil assemblies, the method comprising the following steps:
   a) providing a datum feature on a root portion of each of the aerofoil assemblies, wherein each datum feature is of an identical form and dimension and protrudes from the root portion, and then
   b) locating the datum feature of a first aerofoil assembly in a complementary fixture to secure the first aerofoil assembly;
   c) performing at least one manufacturing step on the secured first aerofoil assembly, while the first aerofoil assembly is wholly supported by the location of the datum feature of the first aerofoil assembly in the complementary fixture;
   d) removing the first aerofoil assembly from the fixture;

e) locating the datum feature of a second aerofoil assembly in the complementary fixture to secure the second aerofoil assembly;
f) performing at least one manufacturing step on the secured second aerofoil assembly, while the second aerofoil assembly is wholly supported by the location of the datum feature of the second aerofoil assembly in the complementary fixture; and
g) removing the second aerofoil assembly from the fixture.

2. The method of claim 1, further comprising the steps of h) locating the datum feature of the first aerofoil assembly in a second complementary fixture to secure the first aerofoil assembly, i) performing at least one manufacturing step on the secured dissimilar aerofoil assembly, and j) removing the first aerofoil assembly from the fixture.

3. The method of claim 1, wherein the manufacturing steps are selected from the group consisting of milling, grinding, turning, chemical machining, polishing, and inspection.

4. The method of claim 1, wherein the aerofoil assemblies are dissimilar in shape and/or size.

5. The method of claim 1, wherein the datum features are machined following an initial manufacture of the aerofoil assemblies corresponding to the datum features and prior to location of the datum features in the complementary fixture.

6. A method of fixturing a plurality of dissimilar aerofoil assemblies, the method comprising the following steps:
   a) providing a datum feature on a root portion of each of the aerofoil assemblies, wherein each datum feature is of an identical form and dimension and protrudes from the root portion, and then
   b) locating the datum feature of a first aerofoil assembly in a complementary fixture to secure the first aerofoil assembly;
   c) performing at least one manufacturing step on the secured first aerofoil assembly, while the first aerofoil assembly is wholly supported by the location of the datum feature of the first aerofoil assembly in the complementary fixture;
   d) removing the first aerofoil assembly from the fixture;
   e) locating the datum feature of a second aerofoil assembly in the complementary fixture to secure the second aerofoil assembly;
   f) performing at least one manufacturing step on the secured second aerofoil assembly, while the second aerofoil assembly is wholly supported by the location of the datum feature of the second aerofoil assembly in the complementary fixture; and
   g) removing the second aerofoil assembly from the fixture, wherein the datum features have an asymmetrical cross-section.

7. The method of claim 1, wherein the datum feature has one or more datum faces.

8. The method of claim 6, further comprising the steps of j) locating the datum feature of the first aerofoil assembly in a second complementary fixture to secure the first aerofoil assembly, i) performing at least one manufacturing step on the secured dissimilar aerofoil assembly, and j) removing the first aerofoil assembly from the fixture.

9. The method of claim 6, wherein the manufacturing steps are selected from the group consisting of milling, grinding, turning, chemical machining, polishing, and inspection.

10. The method of claim 6, wherein the aerofoil assemblies are dissimilar in shape and/or size.

11. The method of claim 6, wherein the datum features each have one or more datum faces.

12. The method of claim 6, wherein the datum features are machined following an initial manufacture of the aerofoil assemblies corresponding to the datum features and prior to location of the datum features in the complementary fixture.

13. A method of fixturing a plurality of dissimilar aerofoil assemblies, the method comprising the following steps:
   a) providing a datum feature on a root portion of each of the aerofoil assemblies, wherein each datum feature is of an identical form and dimension and protrudes from the root portion, and then
   b) locating the datum feature of a first aerofoil assembly in a complementary fixture to secure the first aerofoil assembly;
   c) performing at least one manufacturing step on the secured first aerofoil assembly, while the first aerofoil assembly is wholly supported by the location of the datum feature of the first aerofoil assembly in the complementary fixture;
   d) removing the first aerofoil assembly from the fixture;
   e) locating the datum feature of a second aerofoil assembly in the complementary fixture to secure the second aerofoil assembly;
   f) performing at least one manufacturing step on the secured second aerofoil assembly, while the second aerofoil assembly is wholly supported by the location of the datum feature of the second aerofoil assembly in the complementary fixture; and
   g) removing the second aerofoil assembly from the fixture, wherein the datum features are forged or cast in a forging or casting process through which the aerofoil assemblies are manufactured.

14. The method of claim 13, further comprising the steps of h) locating the datum feature of the first aerofoil assembly in a second complementary fixture to secure the first aerofoil assembly, i) performing at least one manufacturing step on the secured dissimilar aerofoil assembly, and j) removing the first aerofoil assembly from the fixture.

15. The method of claim 13, wherein the manufacturing steps are selected from the group consisting of milling, grinding, turning, chemical machining, polishing, and inspection.

16. The method of claim 13, wherein the aerofoil assemblies are dissimilar in shape and/or size.

17. The method of claim 13, wherein the datum features each have one or more datum faces.

18. The method of claim 13, wherein the datum features are machined following an initial manufacture of the aerofoil assemblies corresponding to the datum features and prior to location of the datum features in the complementary fixture.

* * * * *